(12) United States Patent
Sato

(10) Patent No.: US 11,820,444 B2
(45) Date of Patent: Nov. 21, 2023

(54) CONTROL DEVICE FOR VEHICLE-MOUNTED EQUIPMENT

(71) Applicant: HITACHI ASTEMO, LTD., Hitachinaka (JP)

(72) Inventor: Nobuki Sato, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 218 days.

(21) Appl. No.: 17/423,681

(22) PCT Filed: Dec. 3, 2019

(86) PCT No.: PCT/JP2019/047213
§ 371 (c)(1),
(2) Date: Jul. 16, 2021

(87) PCT Pub. No.: WO2020/149035
PCT Pub. Date: Jul. 23, 2020

(65) Prior Publication Data
US 2022/0111889 A1 Apr. 14, 2022

(30) Foreign Application Priority Data
Jan. 18, 2019 (JP) .................. 2019-007036

(51) Int. Cl.
*B62D 5/04* (2006.01)
(52) U.S. Cl.
CPC ........... *B62D 5/0493* (2013.01); *B62D 5/046* (2013.01); *B62D 5/049* (2013.01)
(58) Field of Classification Search
CPC .................................................. B62D 5/0493
See application file for complete search history.

(56) References Cited

U.S. PATENT DOCUMENTS 5,360,077 A 11/1994 Nishimoto et al.
8,471,388 B2\* 6/2013 Lin .................. H01L 24/11
257/773

(Continued)

FOREIGN PATENT DOCUMENTS

JP 06-056045 3/1994
JP 2011-078221 A 4/2011

(Continued)

OTHER PUBLICATIONS

International Preliminary Report on Patentability dated Jul. 29, 2021 issued in International Application No. PCT/JP2019/047213, with English translation, 11 pages.

(Continued)

*Primary Examiner* — Michael A Berns
(74) *Attorney, Agent, or Firm* — FOLEY & LARDNER LLP

(57) ABSTRACT

A control device for vehicle-mounted equipment according to the present invention includes a first sensor, a second sensor, a first microprocessor, and a second microprocessor. The second microprocessor generates a second sensor data request signal for requesting the second sensor to transmit second sensor data. The first microprocessor determines whether an abnormality has occurred in the second microprocessor based on the second sensor data or the second sensor data request signal, and based on a signal relating to information on the second microprocessor which is transmitted from a second inter-microcomputer communication unit of the second microprocessor.

10 Claims, 6 Drawing Sheets

(56) References Cited

U.S. PATENT DOCUMENTS

| | | | |
|---|---|---|---|
| 10,466,122 B2* | 11/2019 | Nakamura | G01L 25/003 |
| 10,717,462 B2* | 7/2020 | Oka | G01D 3/08 |
| 11,084,523 B2* | 8/2021 | Sasaki | B62D 5/0463 |
| 2011/0074323 A1 | 3/2011 | Mukai | |
| 2021/0129855 A1* | 5/2021 | Nakao | G05B 19/0428 |
| 2022/0063643 A1* | 3/2022 | Fujiwara | B62D 5/049 |
| 2022/0111889 A1* | 4/2022 | Sato | B62D 5/046 |

FOREIGN PATENT DOCUMENTS

| | | |
|---|---|---|
| JP | 2018-106513 A | 7/2018 |
| JP | 2018-146512 A | 9/2018 |
| WO | WO-2018/051550 A1 | 3/2018 |

OTHER PUBLICATIONS

International Search Report on International Patent Application No. PCT/JP2019/047213 dated Mar. 3, 2020 (5 pages).
U.S. Appl. No. 17/418,591, filed Jun. 25, 2021, Hitachi Astemo Ltd.
International Search Report dated Jan. 21, 2020 issued in International Application No. PCT/JP2019/050046, with English translation, 6 pages.
Written Opinion of the International Searching Authority dated Jan. 21, 2020 issued in International Application No. PCT/JP2019/050046, with English translation, 12 pages.
Notice of Allowance on U.S. Appl. No. 17/418,591 dated Jul. 5, 2023.

* cited by examiner

CONTROL DEVICE FOR VEHICLE-MOUNTED EQUIPMENT

TECHNICAL FIELD

The present invention relates a control device for vehicle-mounted equipment, the control device having a microprocessor unit.

BACKGROUND ART

Patent Document 1 discloses an electric power steering device provided with two control units for controlling steering assistance force and communicating with each other, the electric power steering device includes a common power supply for the two control units, means for detecting an overvoltage of the power supply, and means connected to each of the two control units for resetting an operation of each control unit for a predetermined time period after each control unit is activated.

REFERENCE DOCUMENT LIST

Patent Document

Patent Document 1: JP H06-56045 A

SUMMARY OF THE INVENTION

Problem to be Solved by the Invention

Here, in a case in which a control device for vehicle-mounted equipment includes a first microprocessor and a second microprocessor, and the first microprocessor obtains a signal relating to information on the second microprocessor by communication between the microprocessors, there is a problem in that, when the first microprocessor cannot obtain the signal relating to the information on the second microprocessor, the first microprocessor cannot determine whether such an abnormality is due to a communication abnormality or due to an abnormality in the second microprocessor.

The present invention has been made in view of circumstances in the related art, and an object thereof is to provide a control device for vehicle-mounted equipment, the control device being capable of accurately determining an abnormality in a microprocessor.

Means for Solving the Problem

According to one aspect of the present invention, a control device for vehicle-mounted equipment according to the present invention includes a first microprocessor and a second microprocessor. The second microprocessor generates a second sensor data request signal for requesting a second sensor to transmit second sensor data. The first microprocessor determines whether an abnormality has occurred in the second microprocessor based on the second sensor data or the second sensor data request signal, and based on a signal relating to information on the second microprocessor which is transmitted from a second inter-microcomputer communication unit of the second microprocessor.

Effects of the Invention

According to the present invention, it is possible to accurately determine the abnormality in the microprocessor.

MODE FOR CARRYING OUT THE INVENTION

Hereinafter, a control device for vehicle-mounted equipment according to an embodiment of the present invention will be described with reference to the accompanying drawings.

Figure 1:
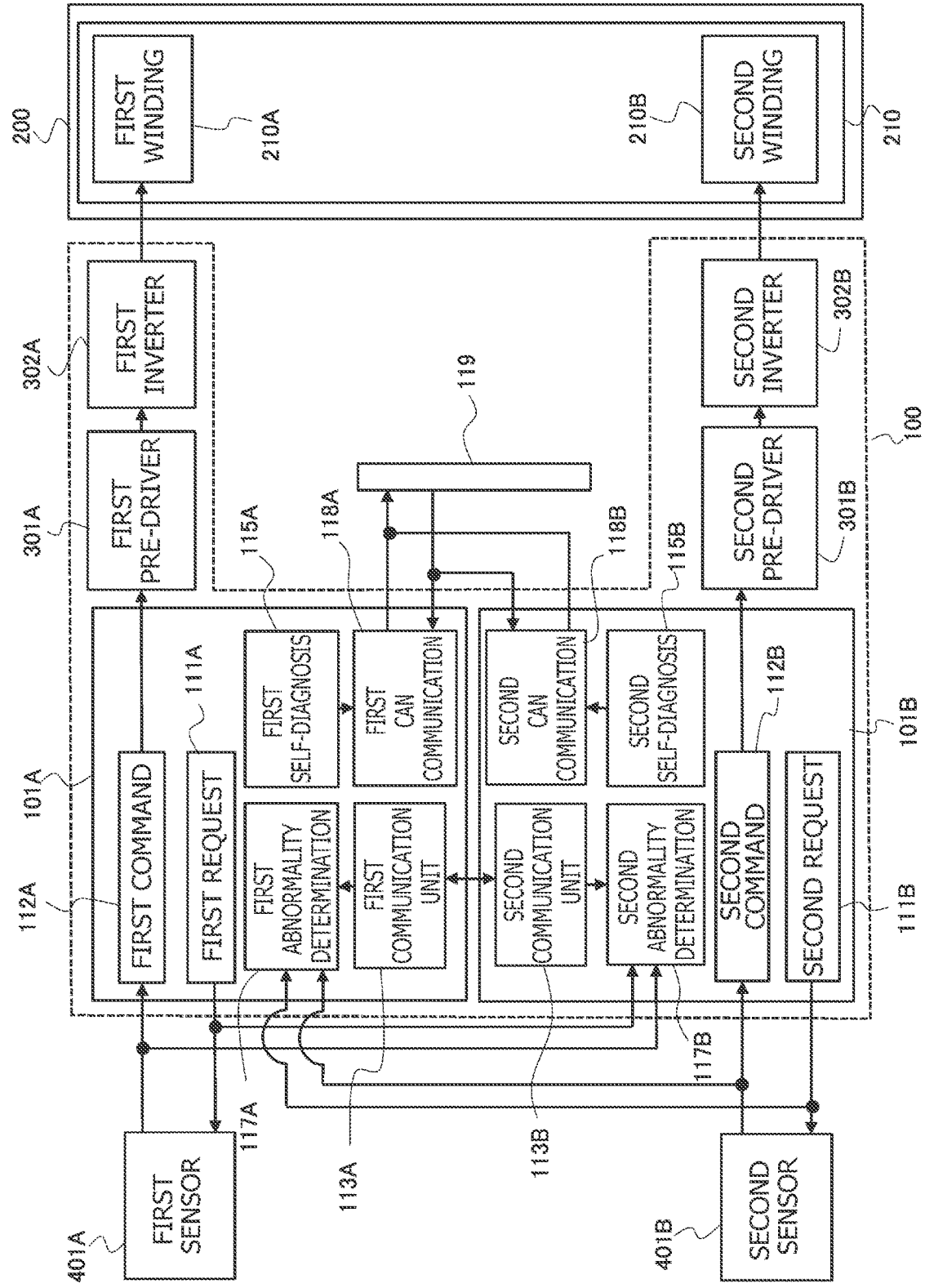
FIG. 1 is a functional block diagram illustrating one aspect of a control device.

FIG. 1 is a block diagram illustrating one aspect of the control device for vehicle-mounted equipment.

A control device 100 of FIG. 1 is an electronic control device which controls an electric power steering device 200 that is mounted to a vehicle, and electric power steering device 200 is a steering device that includes an electric motor 210 that generates a steering force.

In short, electric power steering device 200 is a vehicle-mounted equipment including electric motor 210 serving as an actuator.

Electric motor 210 of electric power steering device 200 is a three-phase brushless motor including a first winding set 210A and a second winding set 210B.

A microprocessor unit (microcontroller unit) of control device 100 includes a first microprocessor 101A (first microcontroller) which controls energization of first winding set 210A of electric motor 210 and a second microprocessor 101B (second microcontroller) which controls energization of second winding set 210B of electric motor 210.

In this case, a first pre-driver 301A and a first inverter 302A control the energization of first winding set 210A based on a command signal generated by first microprocessor 101A, and a second pre-driver 301B and a second inverter 302B controls the energization of second winding set 210B based on a command signal generated by second microprocessor 101B.

First pre-driver 301A controls the turning on or off of a switching element forming first inverter 302A based on the command signal received from first microprocessor 101A, and controls the energization to each winding of first winding set 210A based on the control of the switching element of first inverter 302A.

Meanwhile, second pre-driver 301B controls the turning on or off of a switching element forming second inverter 302B based on the command signal received from second microprocessor 101B, and controls the energization to each winding of second winding set 210B based on the control of the switching element of second inverter 302B.

Then, electric motor 210 is driven based on drive currents of first winding set 210A and second winding set 210B, to thereby generate a motor torque, that is, a steering assist force.

A sensor unit includes a first steering torque sensor 401A serving as a first sensor and a second steering torque sensor 401B serving as a second sensor.

First steering torque sensor 401A and second steering torque sensor 401B each include a sensor element and a simple microcomputer.

First steering torque sensor 401A measures a steering torque of a steering wheel (not illustrated), and outputs first sensor data TDS1 (first steering torque data) which is a signal corresponding to the steering torque as a driving state of the vehicle.

Second steering torque sensor 401B also measures a steering torque which is the same detection subject as that of first steering torque sensor 401A, and outputs second sensor data TDS2 (second steering torque data) which is a signal corresponding to the steering torque.

First microprocessor 101A acquires first sensor data TDS1 output by first steering torque sensor 401A, and obtains the command signal to be output to first pre-driver 301A based on, for example, acquired first sensor data TDS1.

In the same manner, second microprocessor 101B acquires second sensor data TDS2 output by second steering torque sensor 401B, and obtains the command signal to be output to second pre-driver 301B based on, for example, acquired second sensor data TDS2.

First microprocessor 101A includes a first microprocessor self-diagnosis unit 115A, and second microprocessor 101B includes a second microprocessor self-diagnosis unit 115B.

First microprocessor self-diagnosis unit 115A and second microprocessor self-diagnosis unit 115B diagnose whether an abnormality has occurred in first microprocessor 101A and second microprocessor 101B by performing, for example, various kinds of functional diagnosis and error detection.

First microprocessor 101A also includes a first sensor data request signal generation unit 111A.

First sensor data request signal generation unit 111A generates a first sensor data request signal DSR1, and transmits first sensor data request signal DSR1 to first steering torque sensor 401A and second microprocessor 101B.

First sensor data request signal DSR1 is a data signal including information for requesting first steering torque sensor 401A to transmit first sensor data TDS1 to the microprocessor unit.

When first steering torque sensor 401A receives first sensor data request signal DSR1, first steering torque sensor 401A outputs first sensor data TDS1, and first sensor data TDS1 is input to first microprocessor 101A and second microprocessor 101B.

Second microprocessor 101B also includes a second sensor data request signal generation unit 111B.

Second sensor data request signal generation unit 111B generates a second sensor data request signal DSR2, and transmits second sensor data request signal DSR2 to second steering torque sensor 401B and first microprocessor 101A.

Second sensor data request signal DSR2 is a data signal including information for requesting second steering torque sensor 401B to transmit second sensor data TDS2 to the microprocessor unit.

When second steering torque sensor 401B receives second sensor data request signal DSR2, second steering torque sensor 401B outputs second sensor data TDS2, and second sensor data TDS2 is input to first microprocessor 101A and second microprocessor 101B.

First sensor data request signal generation unit 111A and second sensor data request signal generation unit 111B generates and outputs a plurality of first sensor data request signals DSR1 and a plurality of second sensor data request signals DSR2 in a first cycle period PT1 (first cycle period).

First microprocessor 101A also includes a first command signal generation unit 112A, and first command signal generation unit 112A generates a first command signal CS1 to be output to first pre-driver 301A in order to drive electric motor 210 based on, for example, acquired first sensor data TDS1.

Second microprocessor 101B also includes a second command signal generation unit 112B, and second command signal generation unit 112B generates a second command signal CS2 to be output to second pre-driver 301B in order to drive electric motor 210 based on, for example, acquired second sensor data TDS2.

In short, first command signal generation unit 112A and second command signal generation unit 112B are each a functional block which generates a command signal for controlling drive of the actuator based on the sensor data.

First microprocessor 101A further includes a first inter-microcomputer communication unit 113A, and second microprocessor 101B further includes a second inter-microcomputer communication unit 113B.

The inter-microcomputer communication is on-board serial communication performed by connecting first microprocessor 101A and second microprocessor 101B to each other by a dedicated line, and is performed through use of a scheme of, for example, a serial peripheral interface (SPI).

Then, second inter-microcomputer communication unit 113B obtains information on first microprocessor 101A from first inter-microcomputer communication unit 113A through a communication line 114, and first inter-microcomputer communication unit 113A obtains information on second microprocessor 101B from second inter-microcomputer communication unit 113B through communication line 114.

First inter-microcomputer communication unit 113A and second inter-microcomputer communication unit 113B obtain the information on counterpart microprocessors 101B and 101A, respectively, for each second cycle period PT2.

First microprocessor 101A also includes a first abnormality determination unit 117A.

First abnormality determination unit 117A determines whether an abnormality has occurred in second microprocessor 101B based on second sensor data TDS2 or second sensor data request signal DSR2, and based on a signal relating to the information on second microprocessor 101B which is transmitted from second inter-microcomputer communication unit 113B.

In addition, second microprocessor 101B includes a second abnormality determination unit 117B.

Second abnormality determination unit 117B determines whether an abnormality has occurred in first microprocessor 101A based on first sensor data TDS1 or first sensor data request signal DSR1, and based on a signal relating to the information on first microprocessor 101A which is transmitted from first inter-microcomputer communication unit 113A.

First microprocessor 101A also includes a first CAN communication unit 118A serving as an interface for vehicle network connection, which is connectable to an in-vehicle network 119, and second microprocessor 101B also includes a second CAN communication unit 118B serving as an interface for vehicle network connection, which is connectable to in-vehicle network 119.

In-vehicle network 119 is a network provided in the vehicle, through which microprocessors (microcontrollers) can transmit an information signal to each other by serial communication, for example, a controller area network (CAN) bus.

First CAN communication unit 118A and second CAN communication unit 118B each include a CAN transceiver and a CAN controller.

Figure 2:
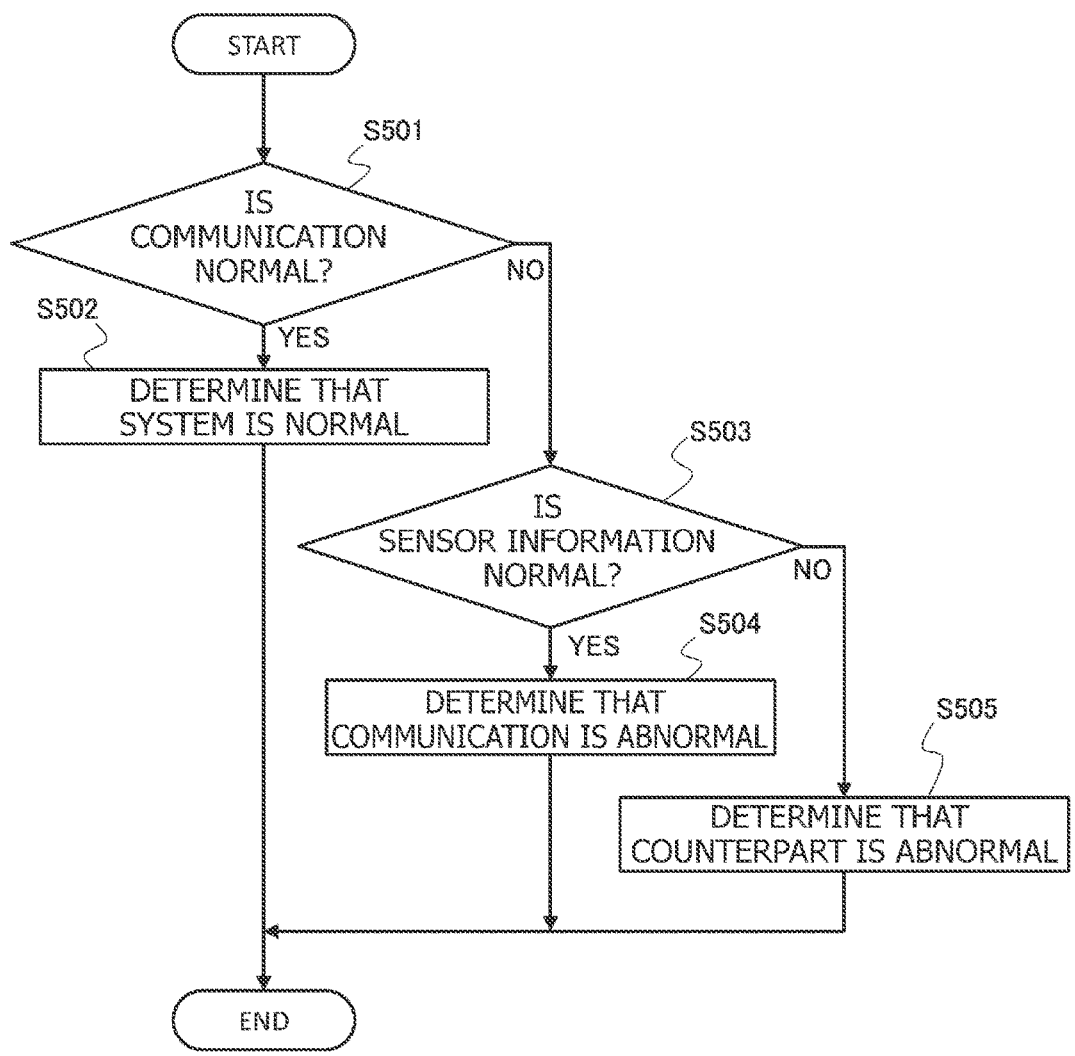
FIG. 2 is a flow chart illustrating a procedure for abnormality diagnosis processing.

FIG. 2 is a flow chart illustrating a procedure for diagnosing an abnormality in second microprocessor 101B, which is performed by first abnormality determination unit 117A of first microprocessor 101A.

First, in Step S501, first abnormality determination unit 117A determines whether an inter-microcomputer communication line to and from second microprocessor 101B is normal or abnormal, that is, the inter-microcomputer communication is being normally performed.

First abnormality determination unit 117A determines an abnormality in the inter-microcomputer communication line when the information on second microprocessor 101B obtained by first inter-microcomputer communication unit 113A has not been updated for a time period that is longer than a third cycle period or when status information is abnormal.

That is, not only when the information relating to second microprocessor 101B obtained by first inter-microcomputer communication unit 113A is interrupted, but also when the information relating to second microprocessor 101B has remained the same information for a fixed time period or longer without change, first abnormality determination unit 117A determines an abnormality in the same manner as when the signal is interrupted, to thereby be able to improve accuracy in determination of an abnormality.

In this case, first abnormality determination unit 117A finalizes the determination that the abnormality has occurred in the inter-microcomputer communication line on condition that the abnormality in the inter-microcomputer communication line has continued over a time period exceeding second cycle period PT2 (second cycle period) being a cycle period of the inter-microcomputer communication. In other words, first abnormality determination unit 117A determines whether an abnormality has occurred in the inter-microcomputer communication line based on a determination time period that is longer than second cycle period PT2.

This can prevent first abnormality determination unit 117A from hastily determining an abnormal state under a state in which the information relating to second microprocessor 101B has not been updated within second cycle period PT2.

Figure 3:
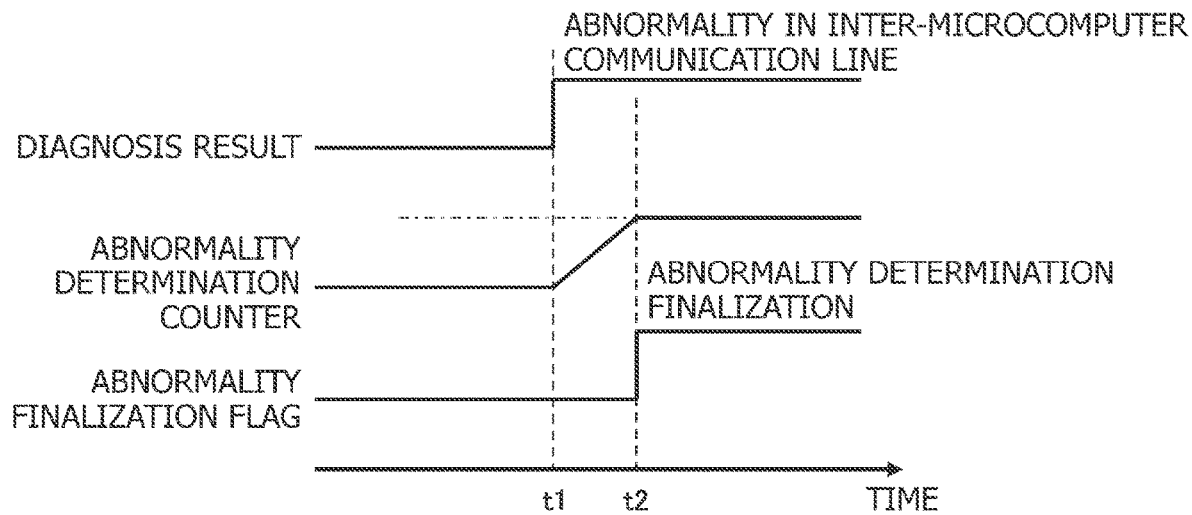
FIG. 3 is a timing chart illustrating processing for finalizing determination of an abnormality.

FIG. 3 is a timing chart illustrating processing for finalizing the determination of an abnormality in the inter-microcomputer communication line to be performed by first abnormality determination unit 117A.

When first abnormality determination unit 117A determines an abnormality in the inter-microcomputer communication line, first abnormality determination unit 117A measures an elapsed time T since a determination timing (time t1 of FIG. 3), and finalizes the determination that the abnormality has occurred at a time point (time t2 of FIG. 3) at which elapsed time T reaches a threshold value TTH indicating a period equal to or longer than second cycle period PT2; that is, at a time point at which a duration of the abnormal state of the inter-microcomputer communication line reaches threshold value TTH.

In short, first abnormality determination unit 117A maintains a state of the inter-microcomputer communication line being determined to be normal until elapsed time T reaches threshold value TTH, and switches the state to a state of the inter-microcomputer communication line being determined to be abnormal when elapsed time T reaches threshold value TTH.

Therefore, it is possible to prevent first abnormality determination unit 117A from determining an abnormality in the inter-microcomputer communication line under a state in which the information relating to second microprocessor 101B has not been updated due to an unreached reception cycle period of first inter-microcomputer communication unit 113A.

When first abnormality determination unit 117A determines in Step S501 that the inter-microcomputer communication line is normal, the processing proceeds to Step S502.

Then, in Step S502, first abnormality determination unit 117A determines that control device 100 is in a normal state, and stores information indicating its diagnostic result in a memory.

In addition, when first abnormality determination unit 117A finalizes the determination that the abnormality has occurred in the inter-microcomputer communication line in Step S501, first abnormality determination unit 117A proceeds to Step S503 to distinguish based on second sensor data TDS2 or second sensor data request signal DSR2 whether second microprocessor 101B is abnormal or whether an abnormality has occurred in the inter-microcomputer communication line, whereas second microprocessor 101B is normal.

Second steering torque sensor 401B outputs second sensor data TDS2 based on second sensor data request signal DSR2 generated by second microprocessor 101B. Therefore, when an abnormality occurs in second microprocessor 101B, second microprocessor 101B cannot normally generate second sensor data request signal DSR2, thereby causing an abnormality in the output of second sensor data TDS2.

Therefore, when second sensor data TDS2 or second sensor data request signal DSR2 is normal, first abnormality determination unit 117A can determine that the inter-microcomputer communication cannot be normally performed due to an abnormality in the inter-microcomputer communication line while second microprocessor 101B is normal.

In addition, when second sensor data TDS2 or second sensor data request signal DSR2 is abnormal, first abnormality determination unit 117A can determine that the cause of the determination of an abnormality in the inter-microcomputer communication line is an abnormality in second microprocessor 101B.

First abnormality determination unit 117A determines an abnormality in second sensor data TDS2 or second sensor data request signal DSR2 when second sensor data TDS2 or second sensor data request signal DSR2 is not updated or when stator information on second sensor data TDS2 or second sensor data request signal DSR2 is abnormal.

Second sensor data TDS2 and second sensor data request signal DSR2 are information to be obtained by first microprocessor 101A without use of the inter-microcomputer communication, and can be obtained without being affected by an abnormality in the inter-microcomputer communication line.

Therefore, even when an abnormality occurs in the inter-microcomputer communication line, first abnormality determination unit 117A can determine that second microprocessor 101B is normal as long as second sensor data TDS2 or second sensor data request signal DSR2 is normal.

In Step S503, first abnormality determination unit 117A finalizes the determination that the abnormality has occurred in second sensor data TDS2 or second sensor data request signal DSR2 on condition that the abnormality in second sensor data TDS2 or second sensor data request signal DSR2 has continued over a time period exceeding first cycle period PT1 (first cycle period) being a generation cycle period of second sensor data request signal DSR2. In other words, first abnormality determination unit 117A determines whether an abnormality has occurred in second sensor data TDS2 or second sensor data request signal DSR2 based on a determination time period that is longer than first cycle period PT1.

This can prevent first abnormality determination unit 117A from hastily determining that an abnormal state has occurred in a state in which second sensor data TDS2 or second sensor data request signal DSR2 has not been updated within first cycle period PT1.

When second sensor data TDS2 is abnormal whereas second sensor data request signal DSR2 is normal, first abnormality determination unit 117A can estimate that the abnormality in second sensor data TDS2 is not due to an abnormality in second microprocessor 101B, but is due to an abnormality in second steering torque sensor 401B.

This can prevent first abnormality determination unit 117A from erroneously determining an abnormality in second microprocessor 101B, based on the abnormality in second sensor data TDS2 due to an abnormality in second steering torque sensor 401B.

When first abnormality determination unit 117A finalizes the determination that second sensor data TDS2 or second sensor data request signal DSR2 is normal in Step S503, first abnormality determination unit 117A proceeds to Step S504 to determine that second microprocessor 101B is normal and that an abnormality has occurred in the inter-microcomputer communication line, and to store the information indicating its diagnostic result in the memory.

In addition, when first abnormality determination unit 117A finalizes the determination that the abnormality has occurred in second sensor data TDS2 or second sensor data request signal DSR2 in Step S503, first abnormality determination unit 117A proceeds to Step S505 to determine that second microprocessor 101B is abnormal, that is, second microprocessor 101B is in a reset state, and to store the information indicating its diagnosis result in the memory.

Although first abnormality determination unit 117A may erroneously determine the abnormality in second microprocessor 101B if the determination is only based on the abnormality in the inter-microcomputer communication, first abnormality determination unit 117A can accurately diagnose whether an abnormality has occurred in second microprocessor 101B by diagnosing second sensor data TDS2 or second sensor data request signal DSR2.

Second abnormality determination unit 117B of second microprocessor 101B diagnoses whether an abnormality has occurred in first microprocessor 101A in accordance with the procedure illustrated in the flow chart of FIG. 2 in the same manner as first abnormality determination unit 117A.

That is, second abnormality determination unit 117B determines whether an abnormality has occurred in first microprocessor 101A by, in Step S501, diagnosing the inter-microcomputer communication line based on the information on first microprocessor 101A obtained by the inter-microcomputer communication instead of diagnosing the information on second microprocessor 101B, and by, in Step S503, diagnosing an abnormality in first sensor data TDS1 or first sensor data request signal DSR1 instead of diagnosing an abnormality in second sensor data TDS2 or second sensor data request signal DSR2.

Figure 4:
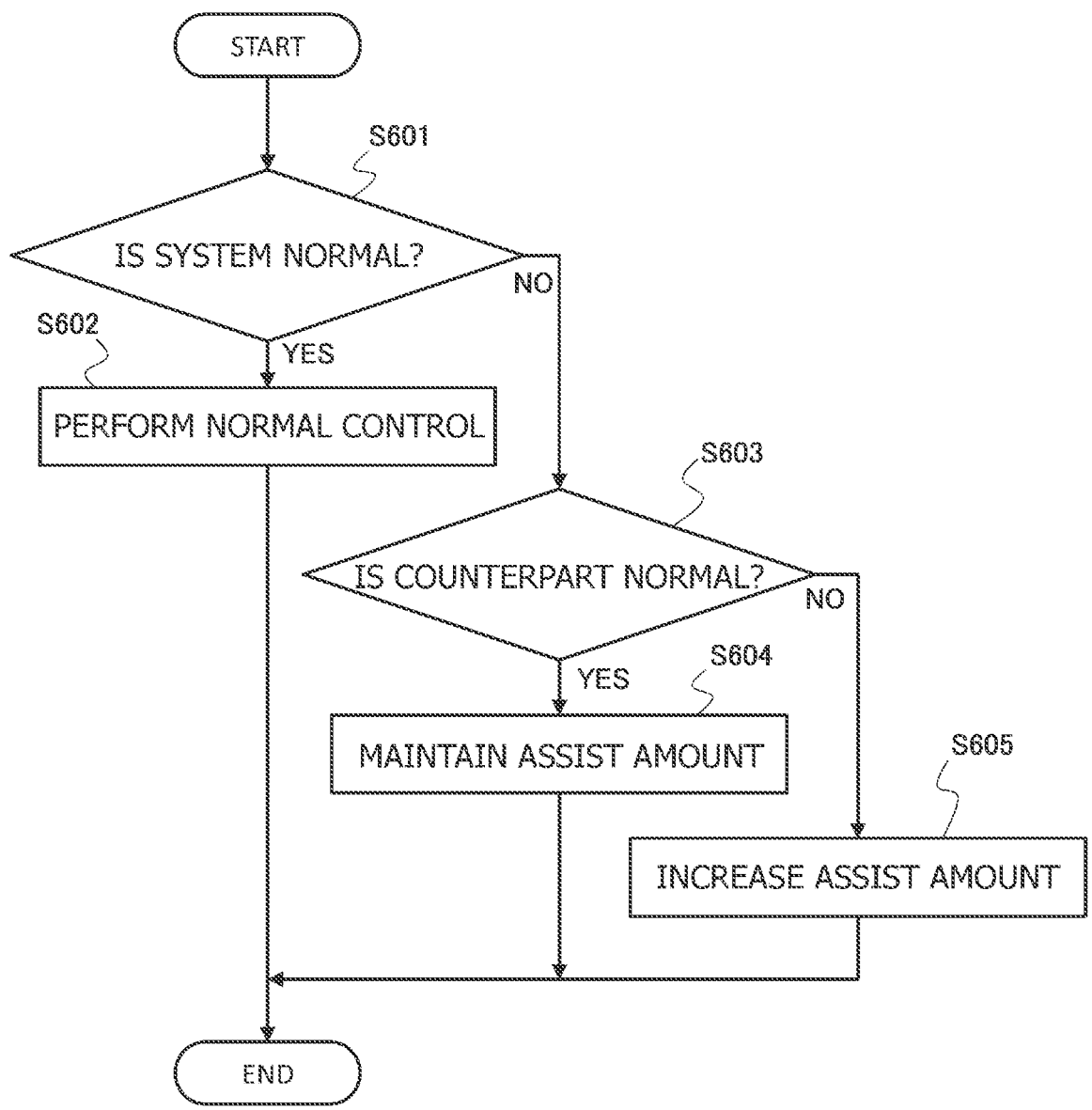
FIG. 4 is a flow chart illustrating a procedure for controlling a steering assist force, namely, an assist amount, based on a diagnosis result.

FIG. 4 is a flow chart illustrating processing for controlling driving of electric motor 210 based on the diagnostic result of first abnormality determination unit 117A to be performed by first command signal generation unit 112A, and more specifically, processing for changing a share of a steering assist force, that is, an assist amount.

First, in Step S601, first command signal generation unit 112A determines whether or not control device 100 is in a normal state in which first microprocessor 101A, second microprocessor 101B, and the inter-microcomputer communication are normal.

When control device 100 is in a normal state, first command signal generation unit 112A proceeds to Step S602 to set a ratio between a steering assist force to be generated through the energization of first winding set 210A and a steering assist force to be generated through the energization of second winding set 210B to a normal value (for example, 50:50).

That is, when control device 100 is in a normal state, in a case in which a sharing ratio of the steering assist force is, for example, 50:50, half of a request value of the steering assist force is generated through the energization of first winding set 210A controlled by first microprocessor 101A, and the remaining half of the steering assist force is generated through the energization of second winding set 210B controlled by second microprocessor 101B.

In addition, when there is an abnormality in second microprocessor 101B or an abnormality in the inter-microcomputer communication, first command signal generation unit 112A proceeds to Step S603 to determine whether or not second microprocessor 101B is abnormal (is in a reset state).

In this case, when second microprocessor 101B is normal and an abnormality has occurred in the inter-microcomputer communication, first command signal generation unit 112A proceeds to Step S604 to maintain the ratio of the steering assist force at a normal value.

That is, when second microprocessor 101B is normal whereas an abnormality has occurred in the inter-microcomputer communication line, first command signal generation unit 112A estimates that second microprocessor 101B is generating a steering assist force corresponding to a normal setting ratio, and itself generates the steering assist force corresponding to the normal setting ratio by the energization control of first winding set 210A as well.

In addition, after first command signal generation unit 112A determines an abnormality in second microprocessor 101B in Step S603, first command signal generation unit 112A proceeds to Step S605 to generate a steering assist force greater than the steering assist force corresponding to the normal setting ratio by the energization control of first winding set 210A.

In other words, first microprocessor 101A corrects a command signal (first command signal) for the steering assist force to be output to first pre-driver 301A so that the steering assist force increases when second microprocessor 101B is abnormal than when second microprocessor 101B is normal.

That is, when an abnormality occurs in second microprocessor 101B, the energization of second winding set 210B controlled by second microprocessor 101B is stopped, and the steering assist force is no longer generated through the energization of second winding set 210B. Therefore, the steering assist force being generated by electric motor 210 decreases from an expected value, thereby increasing a steering load on a driver.

In view of this, in order to suppress a decrease in the steering assist force to be generated by electric motor 210, that is, a shortage of steering assist force, first microprocessor 101A increases the share of the steering assist force to be generated by the energization control of first winding set 210A that is, the share of the steering assist force in first winding set 210A.

In this case, as the processing of Step S605 performed by first command signal generation unit 112A, it is possible to set the ratio of the steering assist force to be generated through the energization of first winding set 210A to 100% to generate the entirety of the requested value of the steering assist force by the energization control of first winding set 210A.

However, it is possible to suppress the decrease in the steering assist force due to the abnormality in second microprocessor 101B by generating a steering assist force greater than the steering assist force at the normal setting ratio by the energization control of first winding set 210A. Therefore, the processing of Step S605 performed by first command signal generation unit 112A is not limited to the processing for taking over all the steering assisting force that has been generated through the energization to second winding set 210B.

In short, when an abnormality occurs in second microprocessor 101B, first command signal generation unit 112A performs processing for increasing the sharing ratio, that is, the steering assist force to be generated, to a level higher than that in the normal state, to thereby suppress the decrease in the steering assist force due to the abnormality in second microprocessor 101B.

Control device 100 illustrated in FIG. 1 includes only one channel of the inter-microcomputer communication line between first microprocessor 101A and second microprocessor 101B, but can include a plurality of channels of the inter-microcomputer communication line so that the inter-microcomputer communication line has a redundant configuration.

Figure 5:
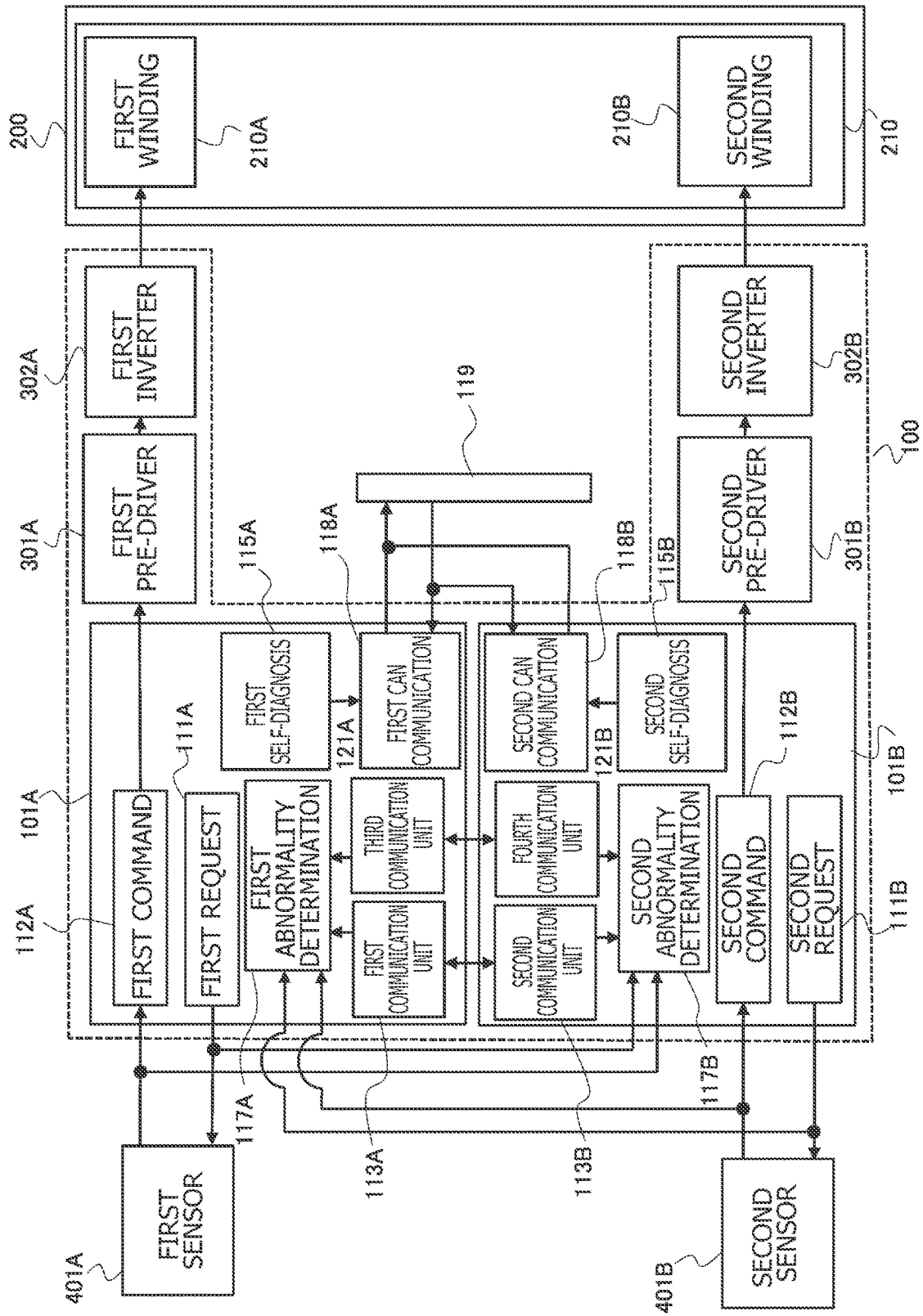
FIG. 5 is a functional block diagram illustrating one aspect of the control device including two channels for inter-microcomputer communication.

FIG. 5 illustrates one aspect of control device 100 including two channels of the inter-microcomputer communication line between first microprocessor 101A and second microprocessor 101B.

In control device 100 of FIG. 5, in addition to the configuration of control device 100 of FIG. 1, first microprocessor 101A includes a third inter-microcomputer communication unit 121A, and second microprocessor 101B includes a fourth inter-microcomputer communication unit 121B.

Then, fourth inter-microcomputer communication unit 121B obtains the information on first microprocessor 101A from third inter-microcomputer communication unit 121A through a communication line 122, and third inter-microcomputer communication unit 121A obtains the information on second microprocessor 101B from fourth inter-microcomputer communication unit 121B through communication line 122.

That is, control device 100 illustrated in FIG. 5 includes: a first inter-microcomputer communication line (first inter-microcomputer communication channel) between first inter-microcomputer communication unit 113A and second inter-microcomputer communication unit 113B; and a second inter-microcomputer communication line (second inter-microcomputer communication channel) between third inter-microcomputer communication unit 121A and fourth inter-microcomputer communication unit 121B.

Therefore, for example, when one of the two channels of the inter-microcomputer communication line has caused an abnormality, but the other is normal, first microprocessor 101A and second microprocessor 101B can acquire information on the counterpart.

In a case in which the abnormality diagnosis processing illustrated in the flow chart of FIG. 2 is to be performed in control device 100 including two channels of the inter-microcomputer communication line illustrated in FIG. 5, when an abnormality occurs in at least one of the two channels of the inter-microcomputer communication line, first abnormality determination unit 117A can advance from Step S501 to Step S503 to determine whether or not the abnormality in the inter-microcomputer communication line is due to the abnormality in second microprocessor 101B based on second sensor data TDS2 or second sensor data request signal DSR2.

In addition, when one of the two channels of the inter-microcomputer communication line has caused an abnormality, but the other is normal, first abnormality determination unit 117A can determine that second microprocessor 101B is normal. When an abnormality has occurred in both of the two channels of the inter-microcomputer communication line, first abnormality determination unit 117A can diagnose whether an abnormality has occurred in second microprocessor 101B based on second sensor data TDS2 or second sensor data request signal DSR2.

That is, first abnormality determination unit 117A determines whether an abnormality has occurred in second microprocessor 101B based on second sensor data TDS2 or second sensor data request signal DSR2, and based on a signal relating to the information on second microprocessor 101B which is transmitted from second inter-microcomputer communication unit 113B or a signal relating to the information on second microprocessor 101B which is transmitted from fourth inter-microcomputer communication unit 121B.

In control device 100 illustrated in FIG. 5, second abnormality determination unit 117B of second microprocessor 101B can also determine whether an abnormality has occurred in first microprocessor 101A in the same manner as first abnormality determination unit 117A.

In addition, a communication scheme between first inter-microcomputer communication unit 113A and second inter-microcomputer communication unit 113B, and a communication scheme between third inter-microcomputer communication unit 121A and fourth inter-microcomputer communication unit 121B, can be set as mutually different communication schemes. For example, the communication scheme between first inter-microcomputer communication unit 113A and second inter-microcomputer communication unit 113B can be set to an LFAST, and the communication scheme between third inter-microcomputer communication unit 121A and fourth inter-microcomputer communication unit 121B can be set to an SPI.

When the communication schemes for the two channels of the inter-microcomputer communication line are the same, the two channels may fail at the same time due to a common cause. In addition, when the communication schemes for the two channels are different, it is possible to reduce the risk of the two channels failing at the same time due to a common cause.

Figure 6:
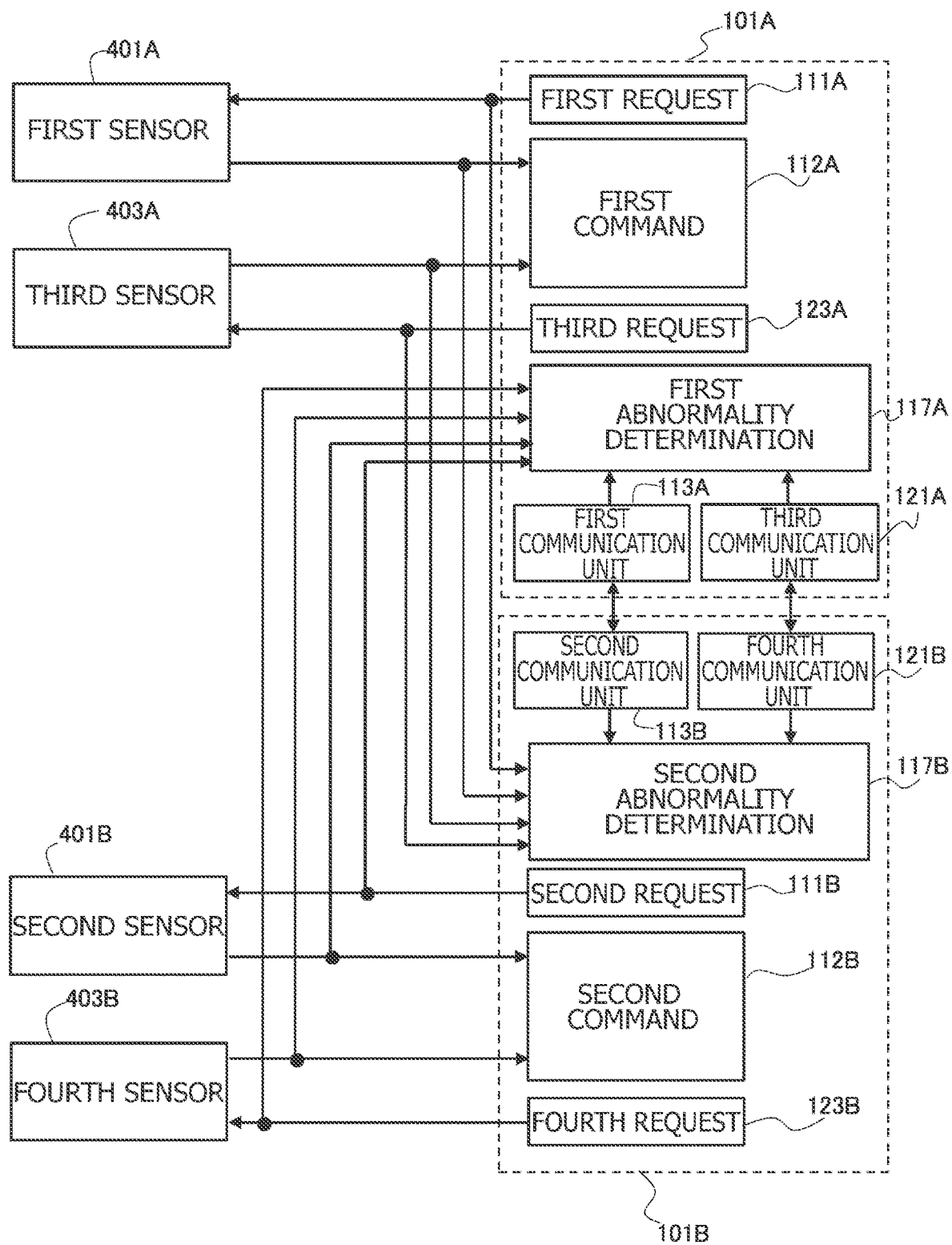
FIG. 6 is a functional block diagram illustrating one aspect of the control device including four sensors.

FIG. 6 illustrates one aspect of control device 100 in which the sensor configured to transmit sensor data based on a sensor data request signal received from first microprocessor 101A is multiplexed, and in the same manner, the sensor configured to transmit sensor data based on a sensor data request signal received from second microprocessor 101B is multiplexed.

In addition to the sensor units of control device 100 of FIG. 5, control device 100 of FIG. 6 includes a third steering torque sensor 403A (third sensor) and a fourth steering torque sensor 403B (fourth sensor).

In this case, third steering torque sensor 403A is a sensor configured to measure the steering torque which is the same detection subject as that of first steering torque sensor 401A, and is paired with first steering torque sensor 401A to form a first system of the sensor unit. In the same manner, fourth steering torque sensor 403B is a sensor configured to measure the steering torque which is the same detection subject as that of second steering torque sensor 401B and is paired with second steering torque sensor 401B to form a second system of the sensor unit.

In addition, first microprocessor 101A includes a third sensor data request signal generation unit 123A in addition to first sensor data request signal generation unit 111A, and second microprocessor 101B includes a fourth sensor data request signal generation unit 123B in addition to second sensor data request signal generation unit 111B.

Then, third steering torque sensor 403A transmits third sensor data TDS3 (third steering torque detection data) to first microprocessor 101A and second microprocessor 101B based on a third sensor data request signal DSR3 generated by third sensor data request signal generation unit 123A.

Furthermore, fourth steering torque sensor 403A transmits fourth sensor data TDS4 (fourth steering torque detection data) to first microprocessor 101A and second microprocessor 101B based on a fourth sensor data request signal DSR4 generated by fourth sensor data request signal generation unit 123B.

In addition, third sensor data request signal DSR3 generated by third sensor data request signal generation unit 123A of first microprocessor 101A is transmitted to third steering torque sensor 403A, and is also transmitted to second microprocessor 101B.

Furthermore, fourth sensor data request signal DSR4 generated by fourth sensor data request signal generation unit 123B of second microprocessor 101B is transmitted to fourth steering torque sensor 403A, and is also transmitted to first microprocessor 101A.

When an abnormality occurs in the inter-microcomputer communication line, first abnormality determination unit 117A distinguishes based on second sensor data TDS2, fourth sensor data TDS4, second sensor data request signal DSR2, or fourth sensor data request signal DSR4 whether second microprocessor 101B is abnormal or whether the inter-microcomputer communication line is abnormal, whereas second microprocessor 101B is normal.

That is, in control device 100 of FIG. 6, first abnormality determination unit 117A can determine that second microprocessor 101B is normal in Step S503 for the abnormality diagnosis processing illustrated in the flow chart of FIG. 2 when, for example, fourth sensor data. TDS4 or fourth sensor data request signal DSR4 can be received irrespective of the abnormality having occurred in second sensor data TDS2 or second sensor data request signal DSR2.

In the same manner, second abnormality determination unit 117B of second microprocessor 101B can determine that first microprocessor 101A is normal in Step S503 for the abnormality diagnosis processing illustrated in the flow chart of FIG. 2 when, for example, third sensor data TDS3 or third sensor data request signal DSR3 can be received regardless of the abnormality having occurred in first sensor data TDS1 or first sensor data request signal DSR1.

Therefore, control device 100 of FIG. 6 can improve reliability of diagnosis of an abnormality in the microprocessor unit.

Furthermore, in control device 100 illustrated in FIG. 6, first microprocessor 101A and second microprocessor 101B can obtain the sensor data of the other system without use of the inter-microcomputer communication line, and even when an abnormality occurs in the inter-microcomputer communication line, it is possible to compare the steering torques (first sensor data TDS1 to fourth sensor data TDS4) measured by the four sensors to one another.

In view of this, when the information on second microprocessor 101B cannot be obtained through the inter-microcomputer communication line, first abnormality determination unit 117A of first microprocessor 101A compares first sensor data TDS1 third sensor data TDS3, and second sensor data TDS2 or fourth sensor data TDS4 to one another, to thereby be able to distinguish between correct sensor data and abnormal sensor data based on determination through majority voting among these pieces of sensor data, and accordingly, be able to identify an abnormal spot in the sensor unit (steering torque sensors 401A, 401B, 403A, and 403B).

That is, pieces of sensor data TDS of normal steering torque sensors have substantially the same value, and hence, when an abnormality occurs in, for example, first steering torque sensor 401A, only the value of first sensor data TDS1 becomes a peculiar value compared to the other plurality of pieces of sensor data TDS.

Therefore, first abnormality determination unit 117A can determine that the pieces of sensor data forming the majority are correct and a piece of sensor data having a peculiar value is incorrect, and can thus determine that the steering torque sensor that has output the sensor data having the peculiar value is abnormal.

When first abnormality determination unit 117A determines an abnormality in, for example, first steering torque sensor 401A, first command signal generation unit 112A can obtain first command signal CS1 to be output to first pre-driver 301A in order to drive electric motor 210 through use of third sensor data TDS3 of third steering torque sensor 403A, and can continue control for generating the steering assist force.

First abnormality determination unit 117A can also store, in the memory, information on the steering torque sensor determined to be abnormal.

In the same manner, second abnormality determination unit 117B can identify the abnormal steering torque sensor, that is, the abnormal spot in the sensor unit, based on the determination through majority voting, and second command signal generation unit 112B can continue the control for generating the steering assist force based on the output of the steering torque sensor determined to be normal by second abnormality determination unit 117B.

In addition, in control device 100 described above, which includes first CAN communication unit 118A and second CAN communication unit 118B together with first microprocessor self-diagnosis unit 115A and second microprocessor self-diagnosis unit 115B, when first microprocessor self-diagnosis unit 115A and second microprocessor self-diagnosis unit 115B each determine that there is an abnormality in the microprocessor of the system itself, first microprocessor self-diagnosis unit 115A and second microprocessor self-diagnosis unit 115B can each transmit a signal relating to the abnormality in the microprocessor of the system itself to the microprocessor of the other system by communication through in-vehicle network 119.

Figure 7:
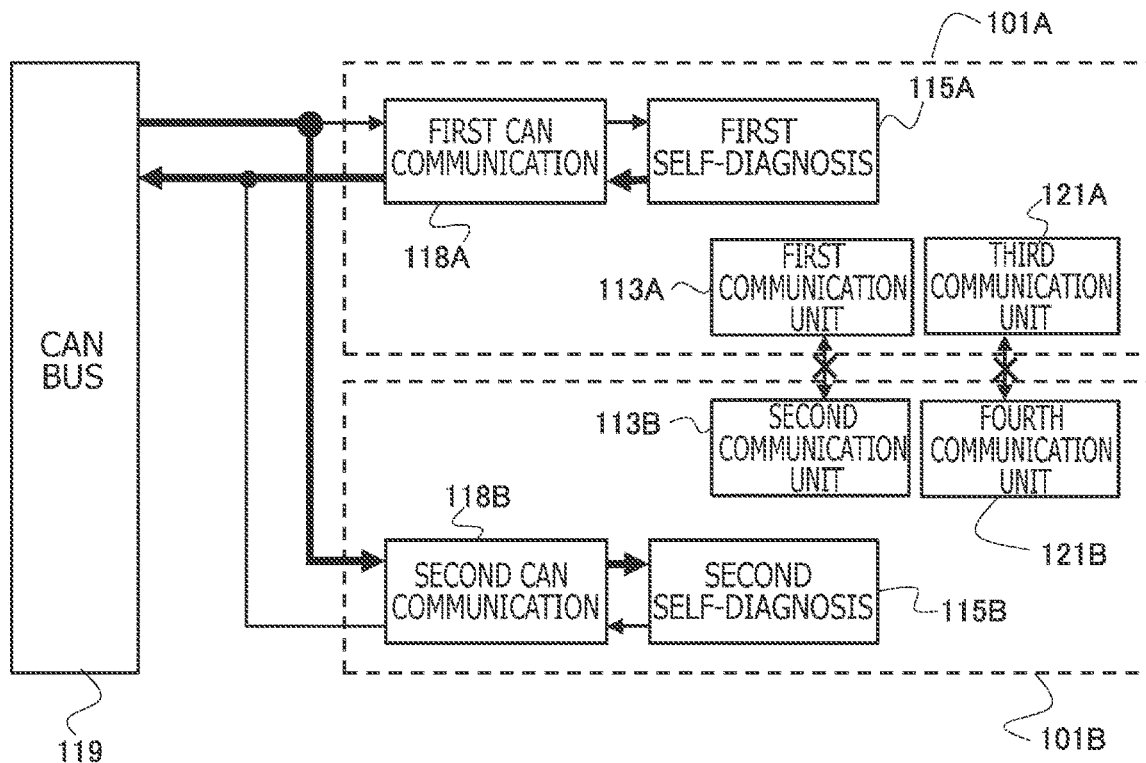
FIG. 7 is a functional block diagram illustrating one aspect of transmission and reception of abnormality information through an in-vehicle network.

FIG. 7 illustrates one aspect of a connection form between each of first CAN communication unit 118A and second CAN communication unit 118B and in-vehicle network 119.

In the connection form of FIG. 7, control device 100 and in-vehicle network 119 are connected to each other by a communication line in one communication channel (two communication lines), and the communication line branches into two channels inside control device 100 to be connected to first CAN communication unit 118A and second CAN communication unit 118B, respectively. In short, in the connection form of FIG. 7, first CAN communication unit 118A and second CAN communication unit 118B share the communication line.

Then, for example, when first microprocessor self-diagnosis unit 115A determines that there is an abnormality in first microprocessor 101A, first CAN communication unit 118A transmits information indicating that there is an abnormality in first microprocessor 101A to in-vehicle network 119 by adding thereto an identifier indicating that the information is directed to second microprocessor 101B. Second microprocessor 101B can acquire information relating to the abnormality in first microprocessor 101A when second CAN communication unit 118B receives such transmission data.

When second microprocessor self-diagnosis unit 115B determines that there is an abnormality in second microprocessor 101B, second CAN communication unit 118B transmits the information relating to the abnormality in second microprocessor 101B to in-vehicle network 119 by adding thereto an identifier indicating that the information is directed to first microprocessor 101A. First microprocessor 101A can acquire the information relating to the abnormality in second microprocessor 101B when first CAN communication unit 118A receives such transmission data.

Figure 8:
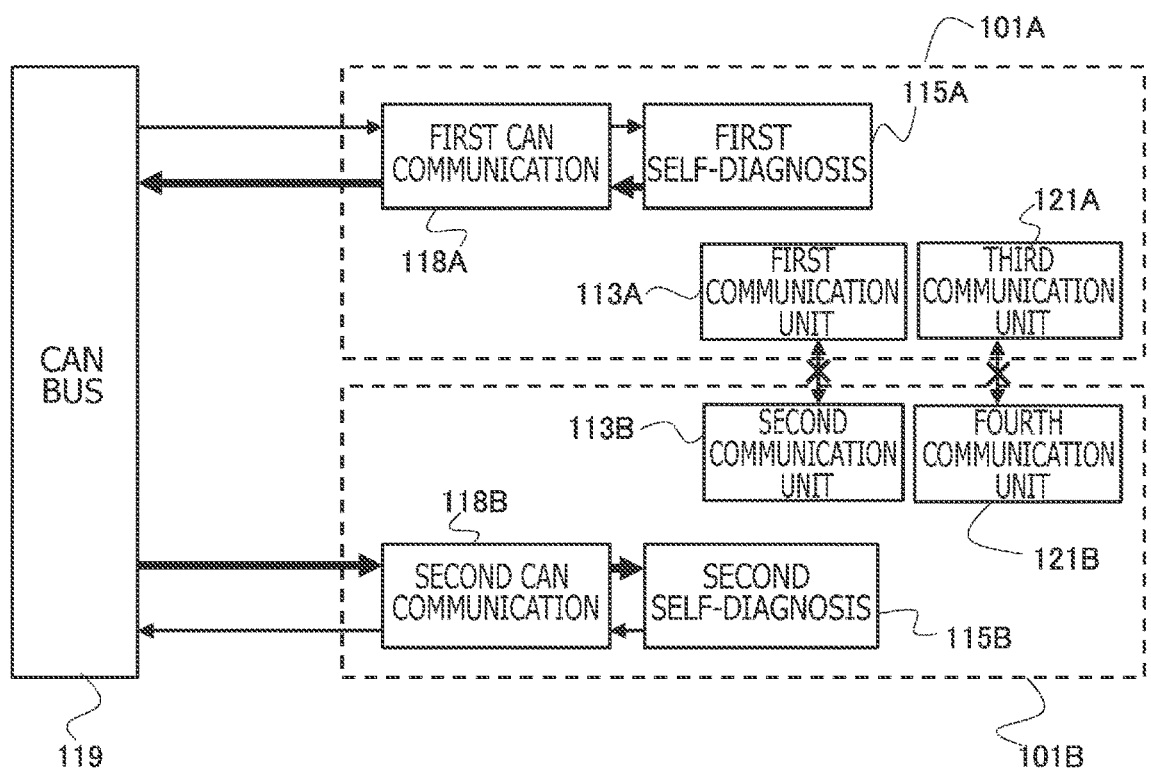
FIG. 8 is a functional block diagram illustrating one aspect of the transmission and reception of the abnormality information through the in-vehicle network.

FIG. 8 illustrates another aspect of a connection form between each of first CAN communication unit 118A and second CAN communication unit 118B and in-vehicle network 119.

In the connection form of FIG. 8, a communication line connecting first CAN communication unit 118A and in-vehicle network 119 to each other and a communication line connecting second CAN communication unit 118E and in-vehicle network 119 to each other are individually provided. In short, in the connection mode of FIG. 8, control device 100 and in-vehicle network 119 are individually connected by two channels of the communication line in units of microprocessors.

In this case, for example, when first microprocessor self-diagnosis unit 115A determines that there is an abnormality in first microprocessor 101A, first CAN communication unit 118A transmits information indicating that there is an abnormality in first microprocessor 101A to in-vehicle network 119 through the dedicated line by adding thereto an identifier indicating that the information is directed to second microprocessor 101B.

Then, second CAN communication unit 118B of second microprocessor 101B receives the information relating to the abnormality in first microprocessor 101A from in-vehicle network 119 through the dedicated communication line.

When second microprocessor self-diagnosis unit 115B determines that there is an abnormality in second microprocessor 101B, second CAN communication unit 118B transmits the information relating to the abnormality in second microprocessor 101B to in-vehicle network 119 through the dedicated line by adding thereto an identifier indicating that the information is directed to first microprocessor 101A.

Then, first CAN communication unit 118A of first microprocessor 101A receives the information relating to the abnormality in second microprocessor 101B from in-vehicle network 119 through the dedicated communication line.

As described above, first microprocessor 101A and second microprocessor 101B can transmit a signal relating to an own abnormality to the counterpart through in-vehicle network 119, and can grasp an operation state of each other even when an abnormality has occurred in the inter-microcomputer communication line.

Therefore, when an abnormality occurs in one of first microprocessor 101A and second microprocessor 101B, the normal microprocessor can perform control for suppressing a decrease in the steering assist force.

The technical concepts described in the abovementioned embodiment may be used in combination as required, as long as no conflict arises.

Furthermore, although the details of the present invention are specifically described above with reference to the preferred embodiment, it will be apparent to those skilled in the art that various modified aspects may be adopted based on the basic technical concepts and teachings of the present invention.

The vehicle-mounted equipment including the actuator is not limited to electric power steering device 200, and for example, a hydraulic braking device including a hydraulic pump as the actuator can be used as vehicle-mounted equipment being a subject of control.

Furthermore, in control device 100 using electric power steering device 200 as a subject of control, the sensor for detecting the driving state of the vehicle is not limited to the steering torque sensor for measuring the steering torque, and may be, for example, a sensor for measuring a steering angle.

REFERENCE SYMBOL LIST

100 Control device
101A First microprocessor
101B Second microprocessor
111A First sensor data request signal generation unit
111B Second sensor data request signal generation unit
112A First command signal generation unit
113A First inter-microcomputer communication unit
113B Second inter-microcomputer communication unit
117A First abnormality determination unit
117B Second abnormality determination unit
200 Electric power steering device (vehicle-mounted equipment)
401A First steering torque sensor (first sensor)
401B Second steering torque sensor (second sensor)

The invention claimed is:
1. A control device for vehicle-mounted equipment including an actuator, the control device comprising:
a sensor unit including a first sensor and a second sensor, the first sensor configured to detect a driving state of a vehicle and to output first sensor data, and the second sensor configured to detect the driving state of the vehicle which is the same detection subject as a detection subject of the first sensor, and to output second sensor data; and a microprocessor unit including a first microprocessor and a second microprocessor, the second microprocessor includes a second sensor data request signal generator and a second inter-microcomputer communicator, the second sensor data request signal generation-unit generator configured to generate a second sensor data request signal, the second sensor data request signal is a data signal that includes information for requesting the second sensor to transmit the second sensor data to the microprocessor unit, and that is transmitted from the second microprocessor to the second sensor and the first microprocessor, the second inter-microcomputer communicator configured to obtain information on the first microprocessor from a first inter-microcomputer communicator, the first microprocessor includes a first sensor data request signal generator, the first inter-microcomputer communicator, a first abnormality determination circuitry, and a first command signal generator, the first sensor data request signal generator is configured to generate a first sensor data request signal, the first sensor data request signal is a data signal that includes information for requesting the first sensor to transmit the first sensor data to the microprocessor unit, and that is transmitted from the first microprocessor to the first sensor, the first inter-microcomputer communicator is configured to obtain information on the second microprocessor from the second inter-microcomputer communicator, the first abnormality determination circuitry configured to determine whether an abnormality has occurred in the second microprocessor based on the second sensor data or the second sensor data request signal, and based on a signal relating to the information on the second microprocessor which is transmitted from the second inter-microcomputer communicator, and the first command signal generator configured to generate a first command signal for controlling drive of the actuator, based on the first sensor data.

2. The control device for vehicle-mounted equipment according to claim 1, wherein the second sensor data request signal generator is configured to output a plurality of the second sensor data request signals in a first cycle period, and wherein the first abnormality determination circuitry is configured to determine whether an abnormality has occurred in the second microprocessor based on a determination time period that is longer than the first cycle period.

3. The control device for vehicle-mounted equipment according to claim 1, wherein the first inter-microcomputer communicator is configured to obtain the information on the second microprocessor from the second inter-microcomputer communicator in a second cycle period, and wherein the first abnormality determination circuitry is configured to determine whether an abnormality has occurred in the second microprocessor based on a determination time period that is longer than the second cycle period.

4. The control device for vehicle-mounted equipment according to claim 1, wherein the first microprocessor further includes a third inter-microcomputer communicator, wherein the third inter-microcomputer communicator is configured to obtain the information on the second microprocessor from a fourth inter-microcomputer communicator, wherein the second microprocessor further includes the fourth inter-microcomputer communicator, wherein the fourth inter-microcomputer communicator is configured to obtain the information on the first microprocessor from the third inter-microcomputer communicator, and wherein the first abnormality determination circuitry is configured to determine whether an abnormality has occurred in the second microprocessor based on the second sensor data or the second sensor data request signal, and based on the signal relating to the information on the second microprocessor which is transmitted from the second inter-microcomputer communicator or a signal relating to the information on the second microprocessor which is transmitted from the fourth inter-microcomputer communicator.

5. The control device for vehicle-mounted equipment according to claim 4, wherein a communication scheme between the first inter-microcomputer communicator and the second inter-microcomputer communicator and a communication scheme between the third inter-microcomputer communicator and the fourth inter-microcomputer communicator are mutually different communication schemes.

6. The control device for vehicle-mounted equipment according to claim 1, wherein the first abnormality circuitry is configured to determine that the second microprocessor or the second inter-microcomputer communicator is abnormal when the signal relating to the information on the second microprocessor, which is transmitted from the second inter-microcomputer communicator, has not been updated for a time period that is longer than a third cycle period.

7. The control device for vehicle-mounted equipment according to claim 1, wherein the sensor unit further includes a third sensor and a fourth sensor, wherein the third sensor is configured to detect the driving state of the vehicle which is the same detection subject as the detection subject of the first sensor, and output third sensor data, wherein the fourth sensor is configured to detect the driving state of the vehicle which is the same detection subject as the detection subject of the second sensor, and configured to output fourth sensor data, wherein the first microprocessor further includes a third sensor data request signal generator, wherein the third sensor data request signal generator is configured to generate a third sensor data request signal, wherein the third sensor data request signal is a data signal that includes information for requesting the third sensor to transmit the third sensor data to the microprocessor unit, and that is transmitted from the first microprocessor to the third sensor, wherein the second microprocessor further includes a fourth sensor data request signal generator, wherein the fourth sensor data request signal generator is configured to generate a fourth sensor data request signal, wherein the fourth sensor data request signal is a data signal, which includes a signal for requesting the fourth sensor to transmit the fourth sensor data to the microprocessor unit, and that is transmitted from the second microprocessor to the fourth sensor, and wherein the first abnormality determination circuitry is configured to determine whether an abnormality has occurred in the second microprocessor based on the second sensor data, the second sensor data request signal, the fourth sensor data, or the fourth sensor data request signal, and based on a signal relating to the information on the second microprocessor which is transmitted from the second inter-microcomputer communicator.

8. The control device for vehicle-mounted equipment according to claim 1, wherein the second microprocessor includes a second command signal generator, wherein the second command signal generator is configured to generate a second command signal for controlling drive of the actuator based on the second sensor data, and wherein the first command signal generator is configured to correct the first command signal so that a value of the first command signal increases when the first abnormality determination circuitry is configured to determine that an abnormality has occurred in the second microprocessor.

9. The control device for vehicle-mounted equipment according to claim 1, wherein the sensor unit further includes a third sensor and a fourth sensor, wherein the third sensor is configured to detect the driving state of the vehicle which is the same detection subject as the detection subject of the first sensor, and configured to output third sensor data, wherein the fourth sensor is configured to detect the driving state of the vehicle which is the same detection subject as the detection subject of the second sensor, and configured to output fourth sensor data, wherein the first microprocessor further includes a third sensor data request signal generator, wherein the third sensor data request signal generator is configured to generate a third sensor data request signal, wherein the third sensor data request signal is a data signal that includes information for requesting the third sensor to transmit the third sensor data to the first microprocessor and the second microprocessor, and that is transmitted from the first microprocessor to the third sensor, wherein the second microprocessor further includes a fourth sensor data request signal generator, wherein the fourth sensor data request signal generator is configured to generate a fourth sensor data request signal, wherein the fourth sensor data request signal is a data signal that includes information for requesting the fourth sensor to transmit the fourth sensor data to the first microprocessor and the second microprocessor, and that is transmitted from the second microprocessor to the fourth sensor, and wherein the first abnormality determination circuitry is configured to identify an abnormal spot in the sensor unit based on determination through majority voting among the first sensor data, the third sensor data, and the fourth sensor data when a signal relating to the information on the second microprocessor is not transmitted from the second inter-microcomputer communicator.

10. The control device for vehicle-mounted equipment according to claim 1, wherein the microprocessor unit includes an interface for vehicle network connection, which is connectable to an in-vehicle network, wherein the in-vehicle network is a network provided in the vehicle to transmit an information signal by serial communication, wherein the first microprocessor includes a first microprocessor self-diagnosis circuitry, wherein the first microprocessor self-diagnosis circuitry is configured to:

determine whether an abnormality has occurred in the first microprocessor; and transmit, when the first microprocessor self-diagnosis circuitry determines that an abnormality has occurred in the first microprocessor, a signal relating to the abnormality in the first microprocessor to the second microprocessor through the in-vehicle network, wherein the second microprocessor includes a second microprocessor self-diagnosis diagnosis circuitry, and wherein the second microprocessor self-diagnosis diagnosis circuitry is configured to:

determine whether an abnormality has occurred in the second microprocessor; and transmit, when the second microprocessor self-diagnosis circuitry determines that an abnormality has occurred in the second microprocessor, a signal relating to the abnormality in the second microprocessor to the first microprocessor through the in-vehicle network.

* * * * *